United States Patent [19]

Bridgelall et al.

[11] Patent Number: 5,907,146
[45] Date of Patent: May 25, 1999

[54] SCANNING SYSTEM AND METHOD OF OPERATION USING WIDE BAND SCANNING ELEMENTS FOR GENERATING ARBITRARY ROTATABLE MULTI-DIMENSIONAL SCANNING PATTERNS IN PORTABLE OR FIXED SCANNING MODES

[75] Inventors: Raj Bridgelall, Mount Sinai; David Goren, Ronkonkoma, both of N.Y.

[73] Assignee: Symbol Technologies, Inc., Holtsville, N.Y.

[21] Appl. No.: 08/761,686

[22] Filed: Dec. 6, 1996

[51] Int. Cl.⁶ ........................................................ G06K 7/10
[52] U.S. Cl. ........................... 235/470; 235/464; 235/462
[58] Field of Search ..................................... 235/462, 470, 235/464

[56] References Cited

U.S. PATENT DOCUMENTS

| | | | |
|---|---|---|---|
| 5,200,597 | 4/1993 | Eastman et al. | 235/455 |
| 5,258,699 | 11/1993 | Grodevant | 235/462 |
| 5,266,787 | 11/1993 | Mazz et al. | 235/462 |
| 5,280,165 | 1/1994 | Dvorkis et al. | 235/470 |
| 5,477,043 | 12/1995 | Dvorkis | 235/462 |
| 5,478,997 | 12/1995 | Bridgelall et al. | 235/470 |
| 5,504,316 | 4/1996 | Bridgelall et al. | 235/462 |
| 5,510,711 | 4/1996 | Molyneaux et al. | 234/309 |
| 5,569,901 | 10/1996 | Bridgelall et al. | 235/470 |
| 5,598,070 | 1/1997 | Coleman | 235/462 |

*Primary Examiner*—Anita Pellman Gross
*Assistant Examiner*—Drew A. Dunn

[57] ABSTRACT

A scanning system is capable of open or closed loop operation for generating arbitrary rotatable multi-dimension with frequency compensation of scanning element. The system includes at least two scan elements positioned substantially orthogonally to each other for generating the arbitrary rotatable multi-dimensional scanning patterns. A power supply is responsive to respective control signals from a set of drive waveforms as inputs to the at least two scan elements. A controller includes an information processing system to store in digital form the desired set of arbitrary rotatable multi-dimensional scan patterns. In a closed loop mode, the controller stores feedback parameters for each scan element with a particular rotational angle and a feedback value at a particular frequency. The controller uses a feedback signal from the scan elements to compute an error signal indicative of the difference in frequency response between the desired frequency response and the actual frequency response and the difference in phase between the scanning elements. The error signal adjusts the control signal provided to the power supply to conform the actual and desired frequency response of the scanning elements thereby substantially eliminating distortion in pattern generation. In an open loop mode, the scanning system is operated without a feedback signal, but the drive waveforms are regularly fine tuned in amplitude and phase to compensate for changes in frequency response due to temperature variations and aging of the scanning elements.

23 Claims, 10 Drawing Sheets

SCANNING SYSTEM AND METHOD OF OPERATION USING WIDE BAND SCANNING ELEMENTS FOR GENERATING ARBITRARY ROTATABLE MULTI-DIMENSIONAL SCANNING PATTERNS IN PORTABLE OR FIXED SCANNING MODES

BACKGROUND OF INVENTION

1. Field of Invention

This invention relates to scanning systems and methods of operation. More particularly, the invention relates to wide band scanning systems operable in both portable and fixed modes of operation for reading various types of indicia.

2. Description of Prior Art

Wide band or omni-directional scanners provide radially symmetric patterns which facilitate reading and decoding of indicia at high speeds in single or multi-axis scan patterns wherein the indica may have parts of different light reflectivity. Typically, such scanners include a high speed scanning component including an electric motor operative for reciprocatingly oscillating a reflector in opposite circumferential directions relative to an output shaft of the motor. Electric power is continuously applied to the motor during scanning. A light beam which impinges on the reflector is rapidly swept across a symbol to be scanned in a predetermined cyclical manner. The scanning component comprises at least one scan means for sweeping the symbol lengthwise along an X-axis direction. Another scan means sweeps the symbol along a transverse Y-direction which is substantially orthogonal to the X-direction to thereby generate various scan patterns such as single line, raster type, lissajous and other omni-directional patterns. When the X and Y axis scanning motors are both driven such that the light reflectors are at a sinusoidally varying rate of speed, the scan pattern at a reference place will be a lissajous type pattern for omni-directional scanning of the indicia. Each scanning element is likely to have a slightly different frequency response due to manufacturing and physical tolerances. Such frequency response differences introduce distortion in pattern generation. To determine the relative differences in scanning performance between two scan elements and to be able to correct for such differences if necessary, motion feedback from the scan elements is required. Motion feedback may be used to (i) correct for spot speed and other dynamic distortions; (ii) determine the scan amplitude of the light beam and maintain it throughout the operating temperature range for the lifetime operation of the scan element; (iii) construct a closed-loop velocity system where the scan mirror movement can be precisely controlled, and (iv) determine if a mechanical failure has occurred by the motor. Typically, a feedback signal is provided from a secondary pickup coil positioned near the primary motor drive coil such that there is no interference between the magnetic fields of the drive and feedback coils. However, the feedback coil should also be close to the oscillating permanent magnet assembly to pick up a strong and clean signal. The position of the drive and pickup coils for optimum performance present conflicting requirements.

The prior art directed to wide band scanning systems includes the following:

U.S. Pat. No. 5,200,597 to J. M. Eastman et al., issued Apr. 6, 1993, discloses a portable bar code scanner and reader which produces an elliptical beam utilizing optics to shape the beam and maintain its elliptical aspects constant over a distance in front of the scanner where bar codes may be located. A digital control system utilizing a computer generates digital gain control signals depending upon the intensity of the return light detected on a scan and adjusts the gain digitally so that on a subsequent scan, the signal level is optimum. The digital gain control can be non-linear by changing the relationship between the value of the digital control signal and the intensity of the detected light in a way to more quickly bring the gain of the system to its proper value as would be the case with an analog automatic gain control system. The digital control of gain is afforded by a digitally operative potentiometer and amplifiers which amplify the photo detected bar code signal and which can be set to provide a required resistance corresponding to a desired level of amplifier gain.

U.S. Pat. No. 5,280,165 to P. Dvorkis et al., issued Jan. 18, 1994, and assigned to the assignee of the present invention, discloses a scanner component supported by holder means for angular oscillating movement in a single scan direction between a pair of scanned end positions or, alternatively, in first and second scanned directions between first and second pairs of scanned end positions. The component is simultaneously angularly oscillated between the first and second pairs of scanned end positions for directing light along the first and second scanned directions, thereby effecting a multidirectional scan pattern over the indicia.

U.S. Pat. No. 5,477,043 to P. Dvorkis, issued Dec. 19, 1995, having an effective filing date of May 8, 1992, and assigned to the assignee of the present invention, discloses a rapidly oscillated scan element or mirror enabling the generation of omni-directional scanning patterns, preferably a resonant asymmetric scan element wherein the scan element is preferably mounted on a vibratory set of components. A control device varies the intensity of electrical energization or the frequency of the electrical energizing current applied to a read-start unit so as to generating varying types of omni-directional scanning patterns over an indicia which is being read by the scan. The read-start unit may impart operation of at least two modes to the scanned element so as to create a precessive lissajous scanning pattern which provides for an annular redundancy of the scan lines of a ⅓-omni-directional scan which can decode at least 33.33% of a 360° orientation enabling the indicia, such as a bar code symbol, to deviate at angles relative to the scan direction of the scanner while being scanned in either presentation or pass-through mode by the scanner.

U.S. Pat. No. 5,504,316 to R. Bridgelall et al., issued Apr. 2, 1996, filed Nov. 17, 1993, and assigned to the assignee of the present invention, discloses systems and methods for scanning one-dimensional and two-dimensional bar code symbols with a first scan pattern that is relatively small and dense so as to be visible to the user and, thereafter, a second, larger and more robust scan pattern for decoding. A light beam scanner generates a light beam toward a symbol to be read and moves the beam along the symbol in an omni-directional scanning pattern. A light detector receives reflected light from the symbol and generates electrical signals responsive to the reflected light and the scanning pattern is controlled in response to the electrical signals. The scanning pattern may be radially symmetric, a rotating line pattern, or a spiral pattern. The pattern control may vary the diameter or trajectory of the light beam and, more particularly, may move the light beam selectively along a first path or a scan path depending on the electrical signals.

None of the prior art discloses a wide band scanner system including a controller which maintains arbitrary rotatable multi-dimensional patterns in an open or closed loop mode of operation; achieves frequency compensation of the scanning elements, and simplifies the generation of feedback signals for error correction purposes.

SUMMARY OF THE INVENTION

An object of the invention is a scanning system and method of operation for generating arbitrary rotatable multi-dimensional scanning patterns for reading various indicia at high speeds in a portable or fixed mode of operation.

Another object is a scanning system which conforms actual frequency response characteristics and desired or calibrated frequency response characteristic of scanning elements in an open or closed mode of operation.

Another object is a scanning system which simplifies the generation of a feedback signal for error correction purposes.

Another object is a controller which compensates or equalizes frequency response differences between scanning elements generating arbitrary rotatable multi-dimensional scanning patterns.

Another object is a controller which compensates for changes in frequency response characteristics of scanning elements in real time.

Another object is a controller including an information handling system using software to process error signals for conforming the actual frequency and desired or calibrated frequency response of scanning elements.

These and other objects, features and advantages are achieved in a scanning system including at least two scan elements positioned orthogonally to each other for generating arbitrary rotatable multi-dimensional scanning patterns in an open or closed loop mode of operation. A power supply means is responsive to a control signal from a plurality of respective control signals representative of a desired set of multi-dimensional scan patterns. The power supply means generates and supplies complimentary drive waveforms to orthogonally positioned, driven scan elements. A controller includes an information processing system to store the set of scan patterns corresponding to the arbitrary rotatable multi-dimensional scan patterns. In the closed loop mode of operation, the driven scan elements generate a feedback signal without a separate pickup coil. The feedback signal represents the position, velocity or acceleration equivalent of the motion of the rotatable scan elements. The feedback signal is provided to the controller in a closed loop mode of operation. The controller also stores at least two sets of feedback parameters, one set defining each scan element at a particular scan angle and another set defining a feedback value at a particular frequency. The information processing system uses the stored parameters to compute an error signal indicative of (i) the difference in frequency response between the desired frequency response and the actual frequency response and (ii) the difference in phase between the scanning elements. The error signal adjusts the control signal provided to the power supply means to conform the actual and desired frequency response of the scanning elements thereby substantially eliminating distortion in pattern generation. In the open loop mode of operation, the scanning system is operated without a feedback signal, but the complimentary drive signals are regularly fined tuned in amplitude and phase to compensate for changes in frequency response due to temperature variations and aging of the scanning elements.

DESCRIPTION OF DRAWING

The invention will be further understood from the following detailed description of a preferred embodiment taken in conjunction with the appended drawing, in which.

DESCRIPTION OF PREFERRED EMBODIMENT

Figure 1A:
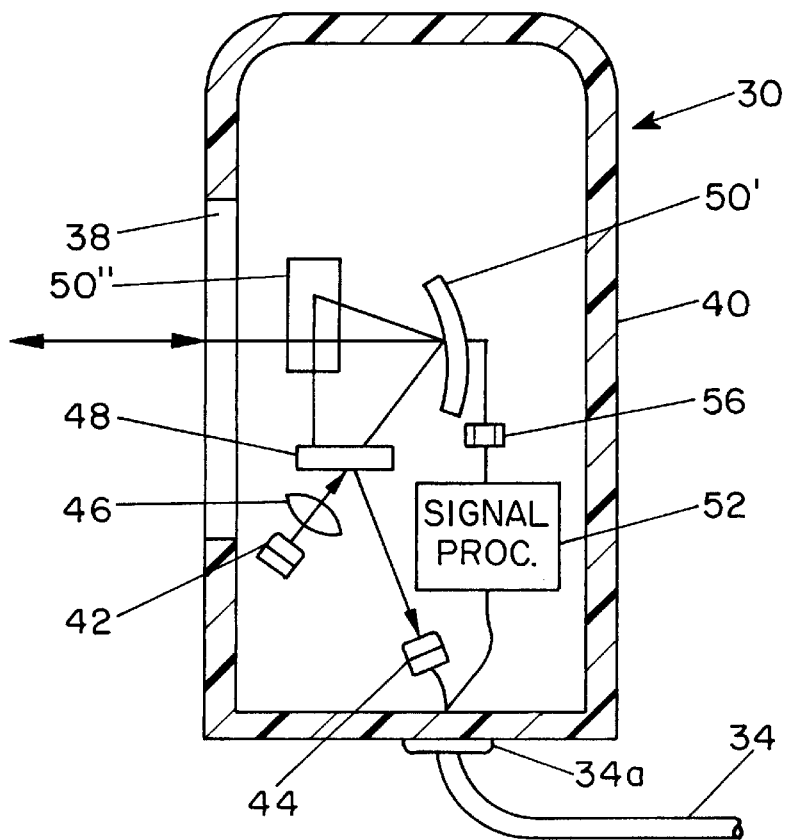
FIGS. 1(a) and 1(b) are representations of a prior art scanning system disclosing the scanning elements and motor structure for generating multi-dimensional scan patterns.
Figure 1B:
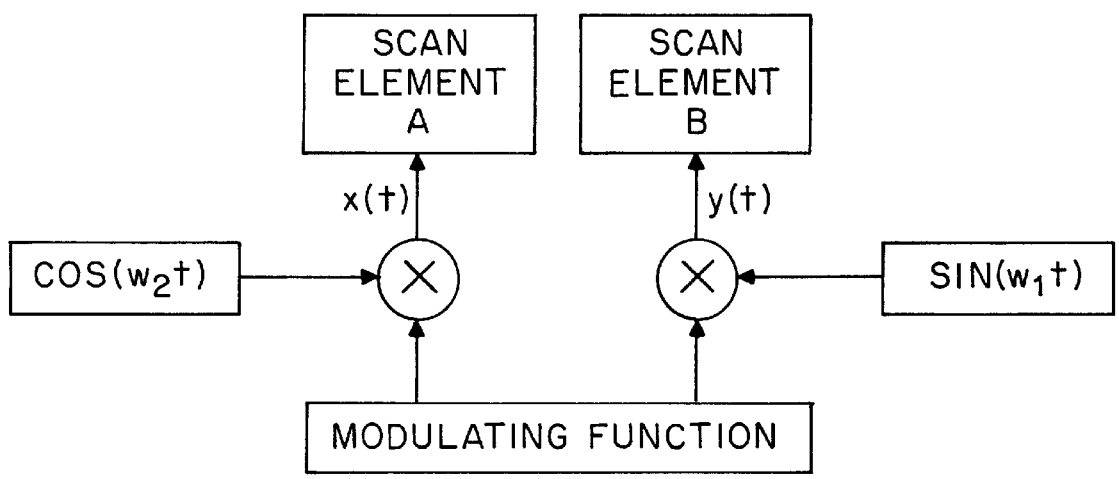

In FIGS. 1(a) and 1(b) a prior art wide band scanner 30 provides single line rotation, raster, lissajous and other patterns. The scanner 30 is described in U.S. Pat. No. 5,504,316 assigned to the assignee of the present invention which is fully incorporated herein by reference. The scanner 30 may be implemented in portable or fixed mode for one-dimensional (1-D) or two-dimensional (2-D) scanning. The scanner 30 is housed in a light-weight, plastic housing 40 containing a light source 42, photodetector 44, optics 46, 48 and oscillating mirrors 50' and 50" mounted in orthogonal relation within the housing 40. In one embodiment the mirrors 50' and 50" may be motor driven but other mechanism may be employed to rotate the mirrors. Single line rotation and other scanning modes are produced by driving the two mirrors for scanning in X and Y directions using the circuit of FIG. 1(b). A suitable lens 38 or multiple lens system will focus a scan beam onto a bar code symbol at an appropriate reference beam. Light source 42 is positioned to introduce a light beam through the partially silvered mirror 48 onto mirror 50" which reflects the light beam to 50' and out through the lens 38 to the bar code symbol. The oscillating mirrors 50' and 50" are connected to scanning motors 56 driven by control/signal processing circuitry 52 using the circuit of FIG. 1(b). Signals to and from the control/signal processing circuitry 52 are carried by exit port 34a and line 34 to external equipment which will be described hereinafter in conjunction with FIGS. 2–5.

Figure 1C:
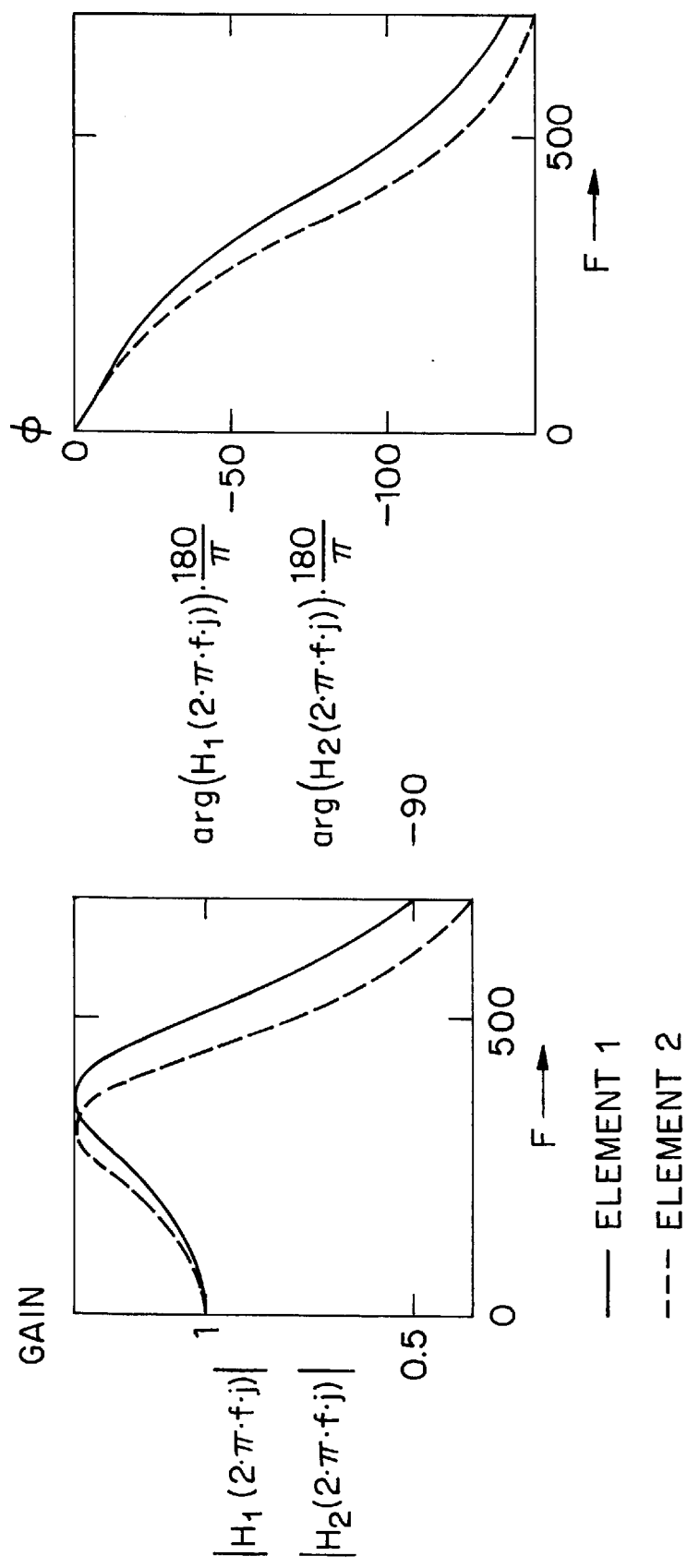
FIG. 1(c) are graphs of typical frequency response characteristics of the wide band scan elements of FIG. 1(a) in terms of gain versus frequency and phase versus frequency.

Typically, each scanning element is likely to have a slightly different frequency response in terms of gain and phase at each frequency as shown in FIG. 1(c) due to manufacturing and physical tolerances. Also, environmental factors such as temperature, humidity, etc., may also cause difference in frequency response of the scan elements. Both scanning elements show a resonant frequency close to 400 Hertz as denoted by the peaks in the gain or amplitude response graph. Thus, when the scanning elements are driven at their resonant frequency, a minimum amount of power will be required to maintain a fixed scanning amplitude, for example 20 degrees. At frequencies above and below the resonant frequency, a large drive power will be required to maintain a fixed scanning amplitude of 20 degrees.

Figure 2:
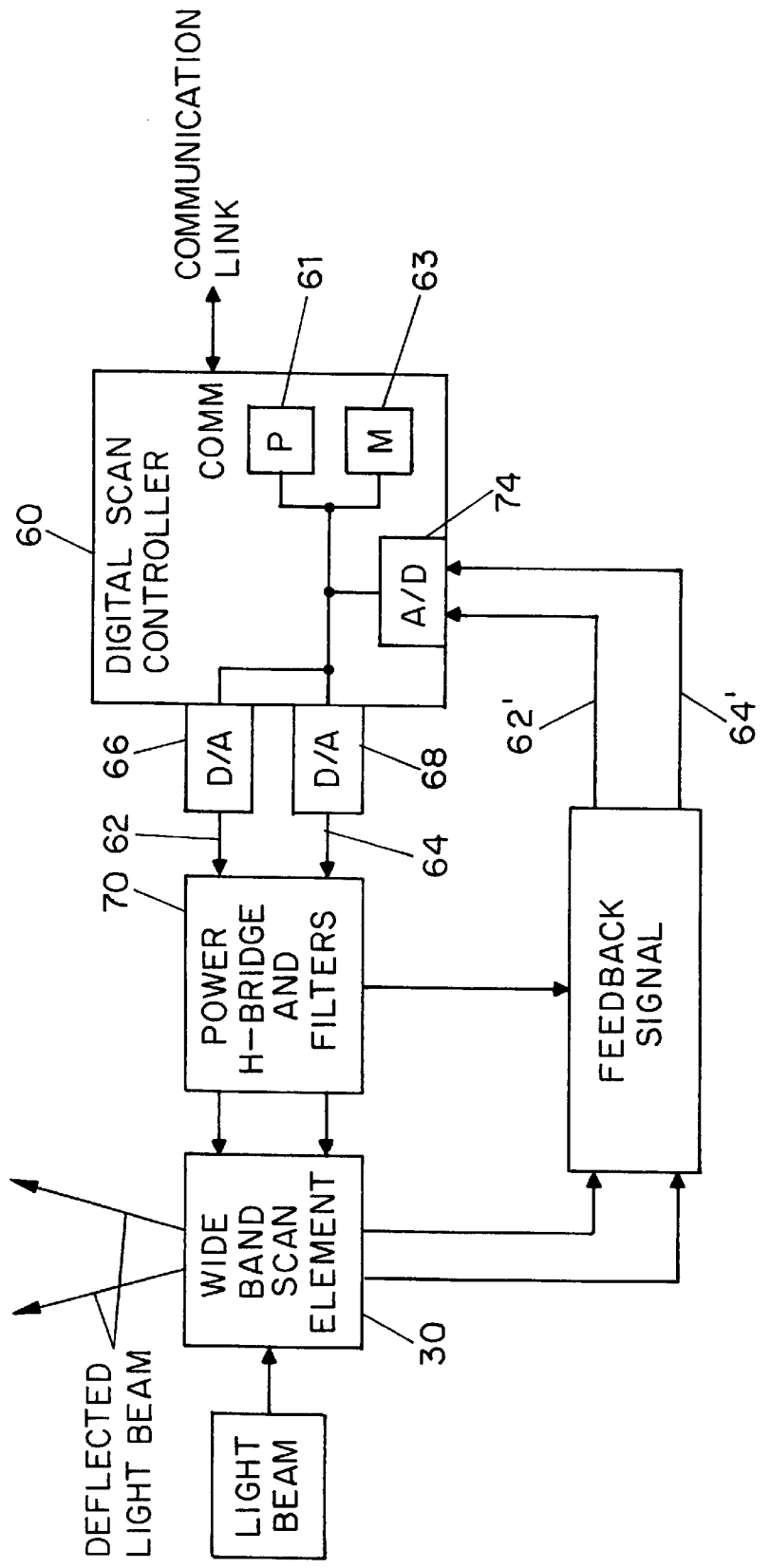
FIG. 2 is a block diagram of a scanning system including a scan controller incorporating the principles of the present invention.

In FIG. 2, a digital scan controller 60 is coupled to the X and Y scanning elements of the scanner 30 through individual signal paths 62 and 64 including power supply means 70 for generation of arbitrary rotatable multi-dimensional patterns. The term arbitrary rotatable multi-dimensional patterns includes single line in any orientation, circles, rosettes and rasters which are generically referred to as rotatable lissajous patterns. While a two element scanner will be described hereinafter, it should be understood that the invention is applicable to plural sets of orthognally or arbitrarily oriented X and Y scanners. Moreover, while motor driven oscillating mirrors 50' and 50" have been described in FIG. 1(a) as scanning elements, other prior art mechanisms are available for driving the oscillating mirrors. Accordingly, the term scanning elements will be used hereinafter to define any drive mechanism including the oscillating the mirrors 50' and 50" for generating the arbitrary rotatable multi-dimensional scanning patterns of the present invention.

The ideal frequency response for the scanning elements is a constant up to the highest frequency that the scanner must produce. To achieve ideal frequency response the controller 60 must compensate for distortions caused by the scan elements and function as an equalizer. In order for the controller to function as an equalizer, the frequency response of each scanning element must be known fairly accurately, at least for the frequency points to which the scan elements will be driven. The frequency responses cannot be stored as a constant because of the manufacturing processes, environmental variations and aging. The controller 60 stores the nominal frequency response profile of the specific scan elements [See FIG. 1(c)] in a memory 63 controlled by a processor 61. The nominal frequency response profile may be obtained or generated during a calibration period as a set of scan parameters, either by the controller just before initial operation or during the manufacturing process via an external controller. A description of the calibration processes will be provided in conjunction with FIGS. 9–11.

The signal paths 62 and 64 include corresponding digital/analog converters 66, 68 and the power supply means 70 which, in one form, may be a digital H-bridge (See FIG. 3) or a linear full bridge (See FIG. 8) driver, both of which will be separately described hereinafter. The power supply 70 is responsive to control signals 49 (See FIG. 4) provided by the controller 60 on lines 62 and 64. The power supply provides drive signals (not shown) to operate the X and Y scanning elements 50' and 50" of the scanner 30 (See FIG. 1(a)). The scanning elements are coupled to feedback circuitry 72 for generating feedback signals on lines 62' and 64' which are indicative of the actual angular position or the frequency response and phase of the oscillating mirrors 50 generating the various scanner patterns. The feedback circuitry will be described in conjunction with FIG. 6. The feedback signals are converted to digital form in A/D converter 74 and used to generate an error signal for modulating the control signal, as will be described hereinafter.

The feedback circuit 62, 64 may be closed or open loop. Closing the control loop has the advantage of tighter loop control that allows the scan element's response to remain stable despite environmental changes. However, this approach effectively increases the damping factor of the overall closed loop system and, therefore, requires more power to provide adequate pattern sizes, and a faster CPU to minimize loop control error. Open loop control provides greater power efficiency, but requires regular fine tuning of amplitude and phase value in order to compensate for responses due to temperature variations and aging. A compromise may be made by driving the scan element with a hybrid approach. That is, occasional and frequent monitoring of a scan element's response in order to compensate for more gradual changes from temperature, humidity and age.

Figure 3:
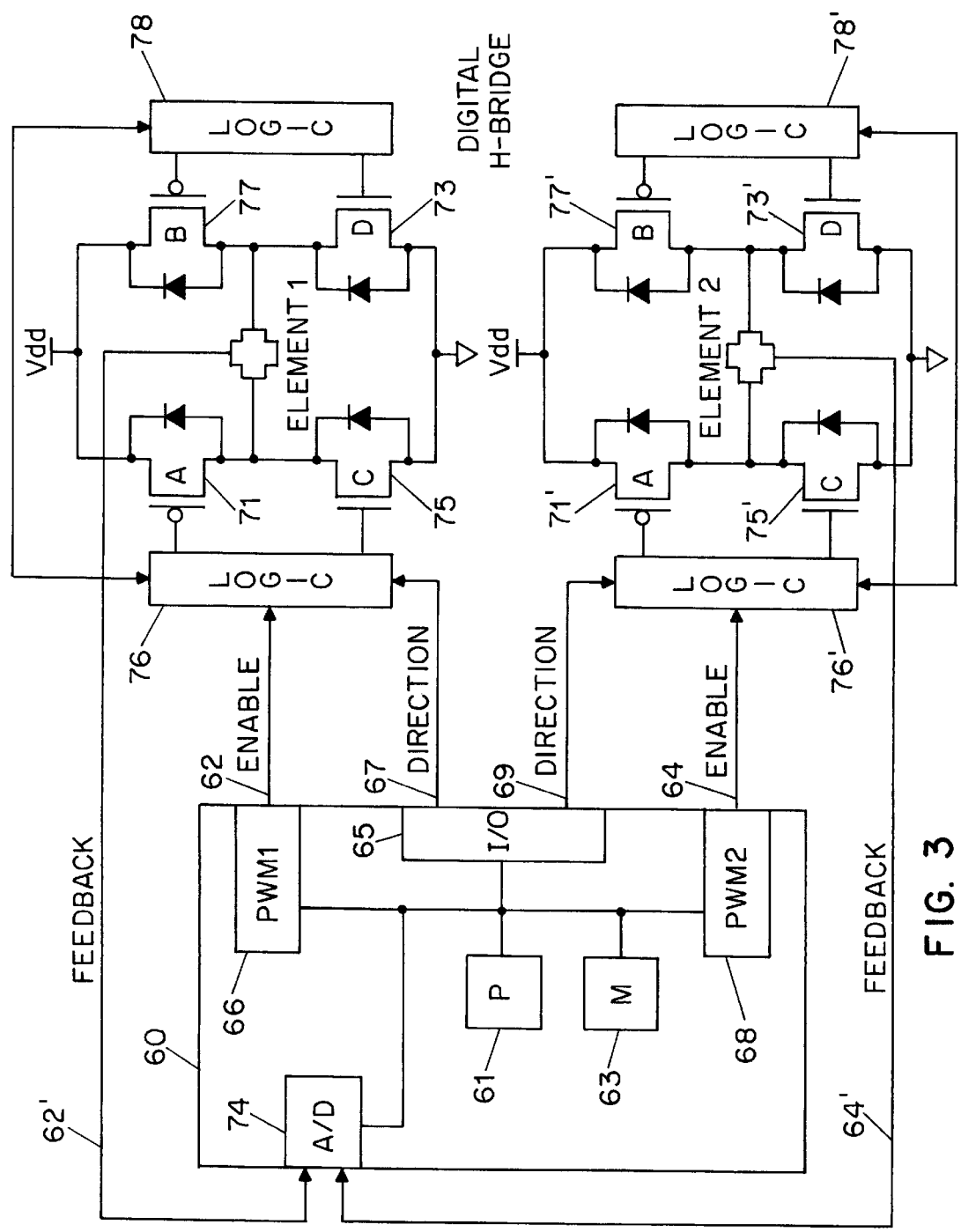
FIG. 3 is a block diagram of the scanning system of FIG. 2 including an H-Bridge power supply.

In FIG. 3, the controller 60 is shown coupled to an H-bridge power supply 70 through lines 62 and 64 which serve to enable the power supply in conjunction with switching signals on lines 67 and 69. The controller includes an information processing system including a standard processor 61 and a memory 63 for, among other things, computing an error signal using software in the form of program instructions stored in the memory. Two sets of feedback parameters are stored in tables in the memory. One set of feedback parameters define each scan element at a particular scan angle and the other parameter set defines the feedback at a particular frequency in a desired frequency response characteristic stored in the memory (see FIG. 1(c)). The parameters are stored in the tables as the inverse of gain and phase values for each frequency component of the desired frequency response characteristics of the at least two orthogonally positioned scan elements. The processor 61 is also connected to the converter 74 which receives on feedback lines 62' and 64' the feedback signal generated as a voltage by the scanning elements. The feedback voltage is converted into digital form and is indicative of the actual position of the mirrors as they rotate under control of the drive signals applied to the scanning elements.

The digitized feedback signal is processed by a digital software filter (stored in the memory) using the feedback parameters stored in the memory. The purpose of the software filter is to transform the feedback signal such that it is representative of the expected motion of the scan element as compared with the desired drive signals for any frequency within the operating range of the scan elements. By virtue of the closed loop feedback system, including the transformation of the feedback signal, the scan element motion will be effectively compensated for any distortions that it would otherwise have had.

The filtered feedback signal is then applied to a differencing function, such that the filtered feedback signal of inverse gain and phase values is compared with a set of scan pattern parameters (stored in the memory) corresponding to a desired rotatable multi-dimensional scan pattern (see FIG. 1(c)). From the differencing function, an error signal (not shown) is generated and applied to the converters 66 and 68. The error signal has magnitude and direction such that when applied to the converters modulates the control signal 49 (See FIG. 4) whereby the waveforms applied to the scanning elements by the power supply 70 will be closer to the desired drive signal. In this manner, as the feedback signal is updated, the error signal is continuously minimized such that the filtered feedback signal is representative of the desired drive waveform.

The processor 61 is also connected to an I/O circuit 65 which provides switching signals on lines 67 and 69 to the power supply 70, shown in the form of a digital H-bridge. The outputs of the converters 66 and 68 are used as an enable signal to turn on diagonally opposite transistors 71, 73 or 75 and 77 under the control of logic circuits 76 and 78. In one form, the converters 66, 68 may exist as pulse width modulators and provide pulse widths 49 as control signals shown in FIG. 4. The outputs of the diagonal pairs of transistors are coupled to the scanning elements including the oscillating mirrors 50', 50". The feedback circuit 62' and 64' are coupled to the scanning elements and provide the voltage feedback signal indicative of the position of the oscillating mirrors. The generation of the feedback signals will be further described in conjunction with FIG. 6.

Figure 4:
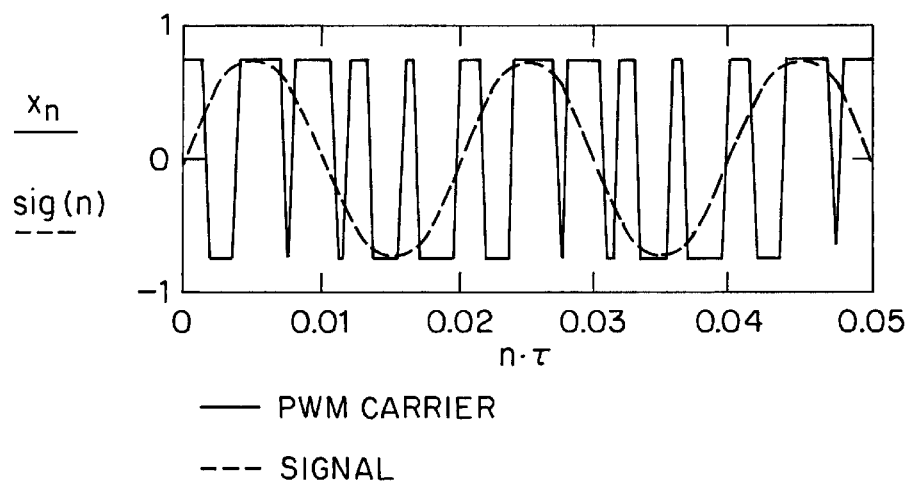
FIG. 4 is a graph of a pulse modulated wave generated by the controller of FIG. 2 as a control signal for the power supply of FIG. 3.

The directional circuit 65 selects the particular pair of transistors and the power supply to be turned on based on the zero crossing of the unmodulated waveform shown in FIG. 4. This switching action essentially provides positive and negative voltage differences across a drive coil (not shown) included in the scanning elements. The drive coil in turn integrates the pulse width modulated square wave and smooths the ripples in the drive function resulting in smooth mechanical motion. The higher the frequency of the pulse width modulated signal, the smoother the drive function. However, the frequency cannot be increased without bound because of efficiency losses primarily due to power radiation in the drive coil. A design trade off is made based on the drive coil characteristics and the scanner frequency response.

Figure 5:
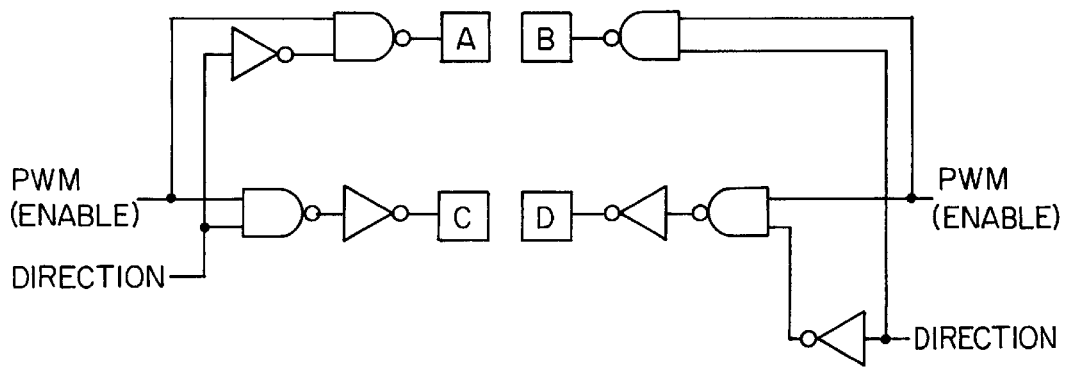
FIG. 5 is a circuit diagram of a control logic circuit in the power supply of FIG. 3.

The logic section 76' and 76" assures that no two transistors in either vertical leg of the power supply 70 are on at the same time. If this happens, the power supply Vdd will be shorted momentarily to ground. A logic circuit which prevents this "shoot through phenomenon" is shown in FIG. 5. The four transistors labeled A–D are specially controlled to assure that only diagonal currents will flow. Analysis of this circuit shows that as long as the switching signals change only during those instances that the pulse width modulated or enable signal is low, the bridge will return to a high impedance condition. During the high impedance state, all transistors are off. Any residual current in the drive coil will be returned to the power supply via the intrinsic diodes of the transistors 71, 73, 75 and 77. The controller will guarantee that the switching signals only change when the pulse width modulated signal is low. In addition, using logic gates with built in hysteresis or schmidt triggers will improve susceptibility from noise glitches.

Figure 6:
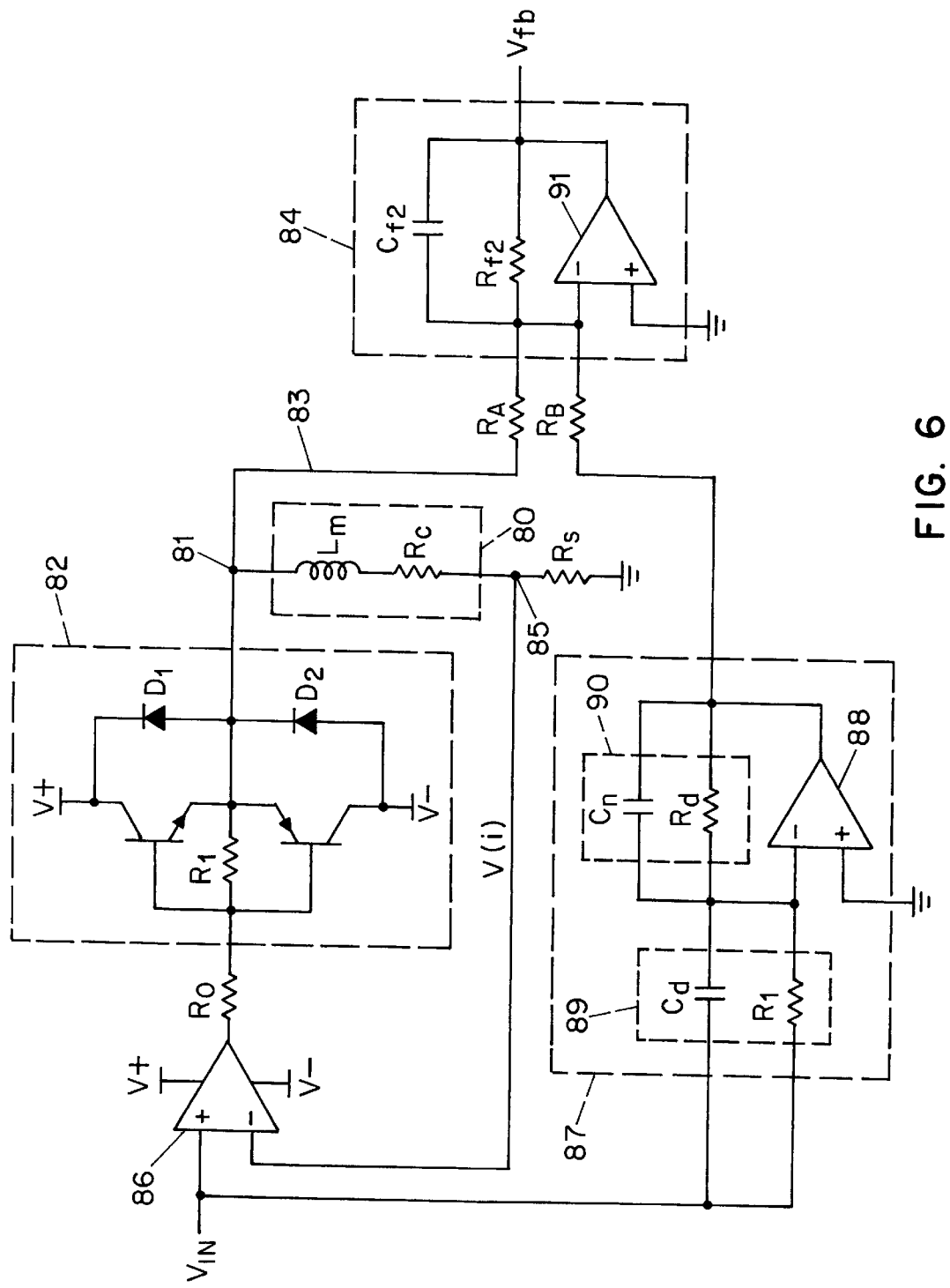
FIG. 6 is a circuit included in FIG. 3 for generating a velocity voltage from the scan elements as a feedback signal for the controller.

FIG. 6 shows the feedback and drive circuit included in both X and Y scanning elements for generating a feedback voltage indicative of the actual velocity of the respective rotating X and Y mirrors. The velocity is also representative of the angular position of the mirrors. The scanning elements include drive coil 80 having an inductance $L_m$ and $R_c$. The present invention, unlike the prior art, does not use a second or pickup coil to generate the feedback voltage for aligning the actual position to, the desired scan position as reflected in the set of scan parameters stored in the memory for each desired frequency response characteristics of the scanning elements. The circuitry of FIG. 6 isolates a voltage in the coil 80 which is representative of the velocity or angular position of the mirrors in the scanning elements. The coil 80 is coupled at a node 81 to a constant current source 82 and provides a first input to an integrator 84 on line 83. The other end of the coil 80 is connected at a node 85 to a load resistor $R_s$ and provides a negative feedback voltage V(i) across the load resistor to a negative terminal of a summing amplifier 86. An input voltage $V_{in}$ is applied to a positive terminal of the summing amplifier 86. $V_{in}$ is representative of the control signal applied to the power supply 70. The output of the amplifier 86 is provided through a dropping resistor R(o) to the current source 82. The voltage at the node 81 is defined by the voltage gain across the coil 80 plus any velocity voltage generated by the scanning elements, and is described by the following equation:

$$V_{coil} = \left(1 + \frac{Z_L}{R_S}\right)V_{in} + V_v \qquad (1)$$

where:
 $Z_L$=Coil Impedance
 $R_S$=Load Resistance
 $V_V$=Voltage Component Proportional to Motor Velocity The input voltage $V_{in}$ is also provided to a transfer circuit 87 which seeks to match the complement or negative of the voltage gain of the coil 80. The transfer circuit includes a summing amplifier 88 having positive and negative input 33terminals. The positive terminal is connected to a reference voltage, typically ground. The negative terminal is connected through an RC circuit 89 to $V_{in}$ at the node 85. The RC circuit 89 includes resistor R1 and capacitor Cd. The output of the summing amplifier 88 is provided as a feedback signal through RC circuit 90 to the negative terminal and as a second input to the integrator 84. The RC circuit 90 includes a feedback resistor $R_d$ and a capacitor $C_n$ which is coupled across the resistor $R_d$ for stability purposes. $C_n$ effectively limits the high frequency noise of the summing amplifier and is chosen small enough so as not to interfere with the accuracy of isolating the velocity feedback time. The output voltage of the transfer circuit 87 is given by the following equation:

$$V(T) = -(1+Z_L/R_s) \cdot V_{in} \qquad (2)$$

When $R_d$ is chosen, the other component values in the circuit are given as follows:

$$R_1 = R_d \div (1 + R_c/R_s)$$

$$C_d = L_m \div (R_s + R_d)$$

The transfer voltage and the coil voltage are provided through resistors $R_a$ and $R_b$ to the negative terminal of a negative feedback amplifier 91 included in the integrator 84. The transfer voltage and the coil voltage offset one another except for the voltage component included in the coil voltage which is representative of the velocity or the angular positions of the mirrors. The values of $R_a$ and $R_b$ are chosen to be equal and at least 10 times greater than the coil impedance at the highest frequency that the circuit is required to operate.

Since the feedback signal increases with frequency, an integrating function will provide proper compensation so that the feedback signal is of constant amplitude throughout the operating frequency range. The values of $R_{f2}$ and $C_{f2}$ in the integrator are assigned such that the associated circuitry is an integrator.

For adjustability and balancing, the resistors $R_b$ and $R_a$ may be replaced by a potentiometer. Resistor $R_1$ may also be adjustable in order to compensate for a variation of the coil resistance.

Turning to FIG. 6, the operation of the controller will be described for either closed loop or open loop control. For closed loop operation, the controller will generate the following waveforms:

$$E_{CL1} = A_{E1}[\cos(\alpha n)\sin(F_2 nT) - \sin(\alpha n)\sin(F_j nT)] \qquad (3)$$

$$E_{CL2} = A_{E2}[\sin(\alpha n)\sin(F_L nT) + \cos(\alpha n)\sin(F_j nT)] \qquad (4)$$

Equations 3 and 4 are parametric equations which rotate a vector formed by sin ($F_i$nT) and sin ($F_j$nT), at a frequency F. The parameter "T" represents a sample period and "n" the number of sample instances. The resultant vectors $E_{cl1}$ and $E_{cl2}$ are then scaled by predetermined variables, $A_{E1}$ and $A_{E2}$ at a rotation speed "a". When feedback signals for both scan axes are sampled, the results are scaled by a constant in order to compensate for the velocity voltage. The error signal is then computed and generated to correct the actual (X, Y) position to the desired position. As the sample rate is increased, errors will be corrected more frequently, and thus, more accurate closed loop control will result.

In an open loop operation, the controller will generate the following equations:

$$E_{CL1} = A_{1L} \cos(an) \sin(F_I nT) - A_{1J} \sin(an) \sin(F_J nT)] \quad (5)$$

$$= A_{2i} \sin(an) \sin(F_I nT) + \phi_i) - A_{2J} \cos(an) \sin(F_J nT \quad (6)$$

Each frequency component (I, J) of the resultant vector is adjusted separately in order to correct for amplitude and phase distortion. These values are derived in the calibration process which will be described hereinafter. After a predetermined period of time, the controller will need to check the scan elements responses to each frequency component and make fine adjustments back to the calibrated value as environmental conditions change. This will keep the scan amplitudes and the phase differences constant.

In either open or closed loop control, the controller may be updated with new scan patterns. New frequencies, amplitudes, and rotation speeds into equations 3–6 and theoretically define a new scan pattern. Immediately after these new parameters are read, the controller will need to fine tune and update the appropriate amplitude and phase components of the new parametric equations.

Figure 7:
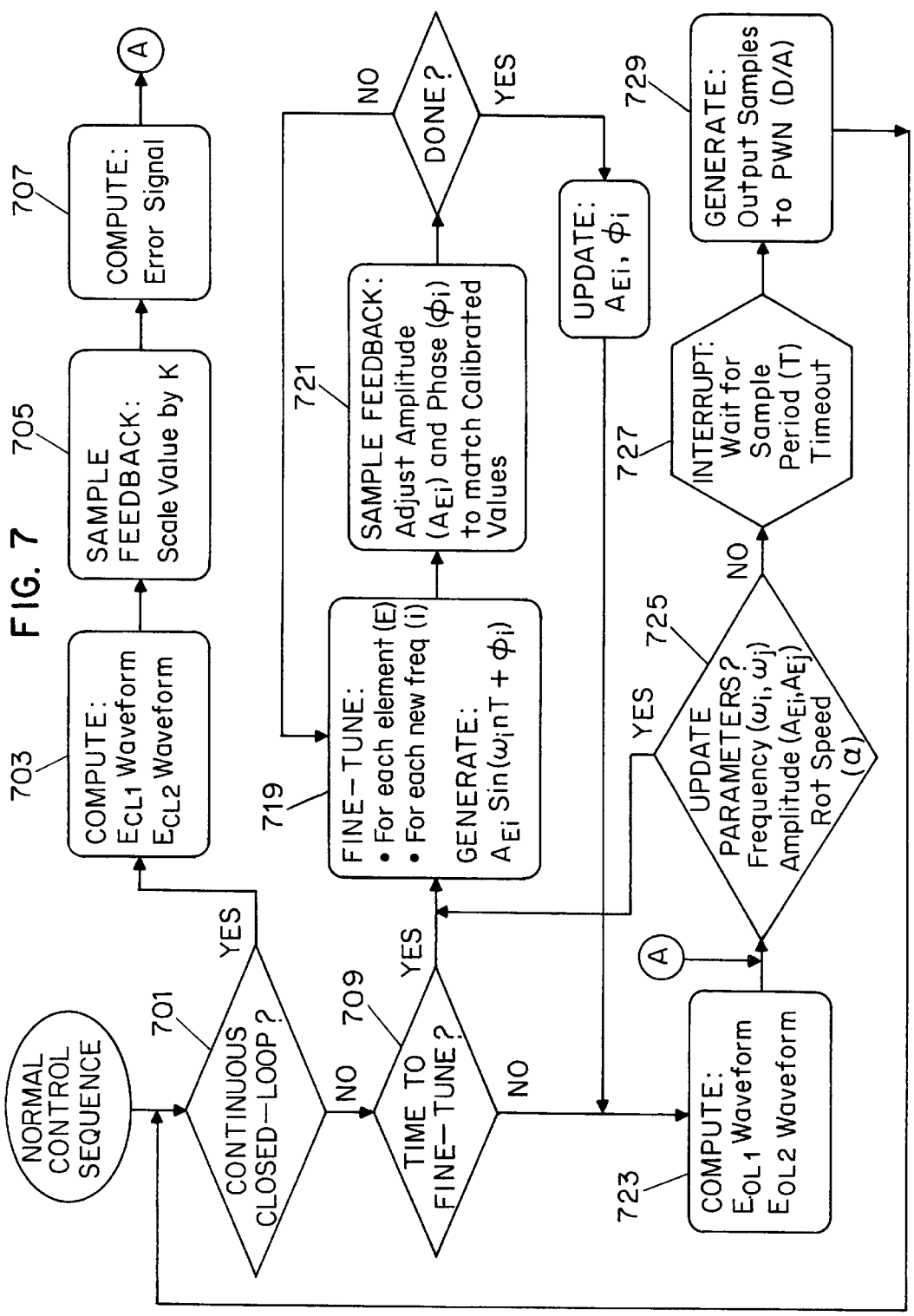
FIG. 7 is a flow diagram for operating the scanning system of FIG. 3 in either an open or closed loop mode of operation.

In FIG. 7, the operation will be described for closed or open loop control in generating arbitrary rotatable multi-dimensional scan patterns. The normal control sequence is entered by determining in an operation 701 whether the controller is performing in closed or opened loop feedback. A "yes" condition initiates a compute operation 703 which calculates the waveforms $E_{cl1}$ and $E_{cl2}$ defined in Equations 1 and 2. The calculated waveforms represent the desired frequency response and phase of the scanning element for the pattern being generated by the scanner.

An operation 705 samples the feedback supplied to the controller and computes an error signal in an operation 707 indicative of the difference in frequency response between the desired frequency response and actual frequency response for the pattern being generated. The error signal is provided as an input in updating the parameters of the waveform as will be described hereinafter.

Returning to the operation 701, a "no" condition indicates open loop control for the controller which initiates an operation 709 to determine whether a calibrated frequency response applied to the scanners should be fine tuned. A "no" condition initiates an operation to compute the waveforms $E_{cl1}$ and $E_{cl2}$. A "yes" condition initiates an operation 719 for fine tuning for each frequency element contained in the equations 5 or 6 defining the calibrated waveforms. Each new frequency in the waveform generates a component $A_g$ $\sin(F_n T + \phi)$. An operation 721 adjusts the amplitude and phase of the waveforms to match the calibrated values. The operations 719 and 721 are repeated until all frequencies in the desired frequency response characteristic have been fine tuned. The updated components of the wave form are provided as an input to an operation 723 which computes the values of the calibrated waveforms defined in equations 5 and 6. An operation 725 corrects the computed waveforms using the error signal generated in the operation 707 if the controller is in the closed loop mode of operation. The operation 725 also updates or introduces new waveforms applied to the scanning elements in terms of frequency amplitude and rotation speed whether the controller is in the closed or open modes of operation. A "yes" condition returns the process through the operation 719 to fine tune the waveforms. A "no" condition initiates an operation 727 to detect sample period timeouts. Upon the occurrence of the sample period, operation 729 generates error signals indicative of the difference between the actual and calibrated frequency response of the scanning elements. The error signals are applied to the pulse width modulators 66 and 68 for modulating the control signals applied to the power means 70. The larger the difference between the actual and calibrated frequency response the smaller the error signal and vice versa. The process is returned to step 701 after the error signals have been supplied to the pulse width modulators.

Figure 8:
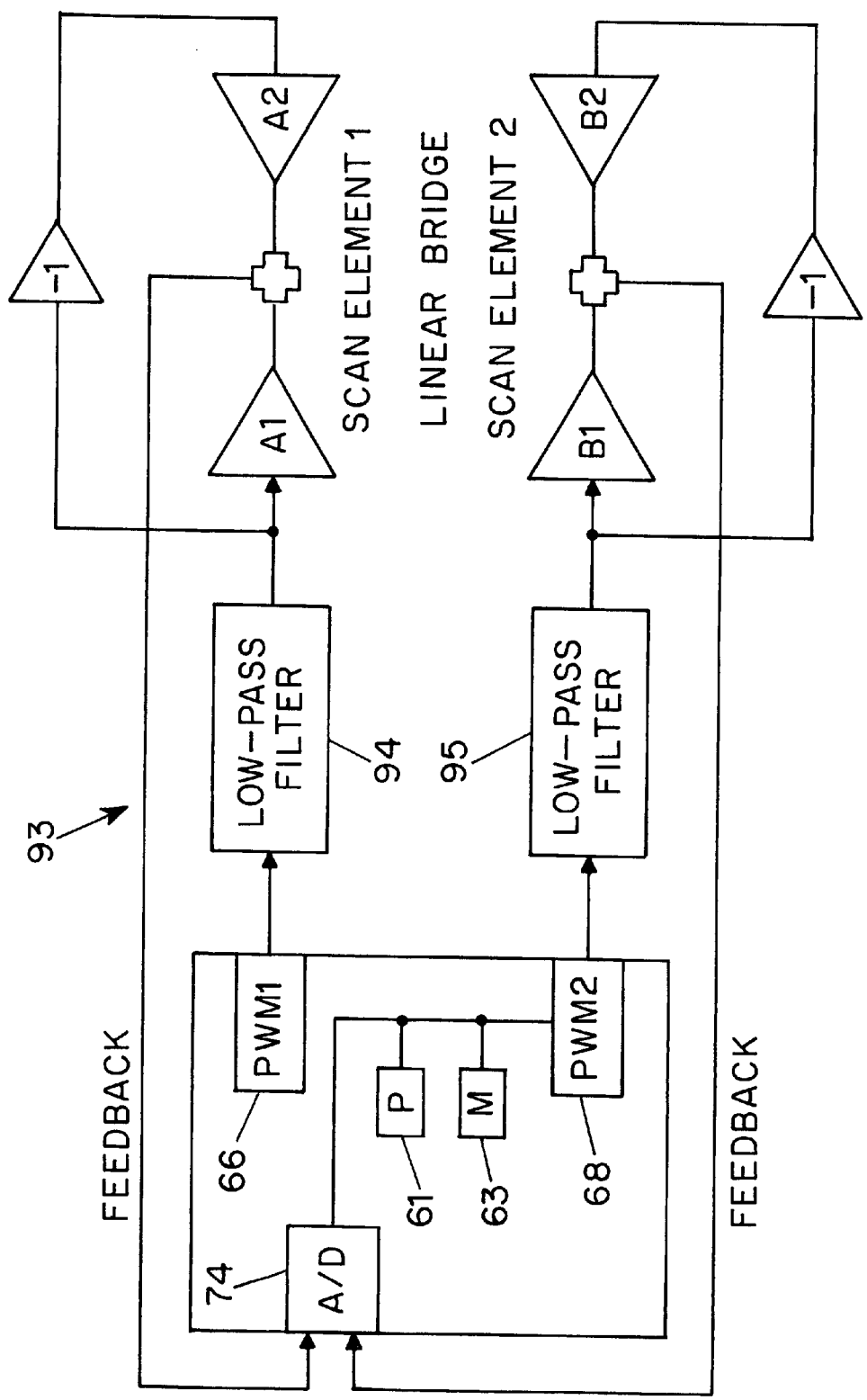
FIG. 8 is a circuit diagram of an alternative power means for the scanning system of FIG. 3.

Turning to FIG. 8, a linear full bridge power drive 93 may be substituted for the H-bridge power supply 70 described in conjunction with FIG. 3. In FIG. 8, the outputs of the modulators 66 and 68 are provided to low pass filters 94 and 95 to provide D/A conversion. Alternatively, a direct digital-to-analog converter may be used instead of filtered pulse width modulators. The low pass filters can be used to recover the fundamental analog waveform which is then converted into differential waveforms by complimentary power amplifiers A1 and A2 directly driving the coils of the scanning elements. The power amplifiers must meet various drive currents and capacitive load criteria and have adequate common mode output voltage swings in order to fit power supply requirements.

Figure 9:
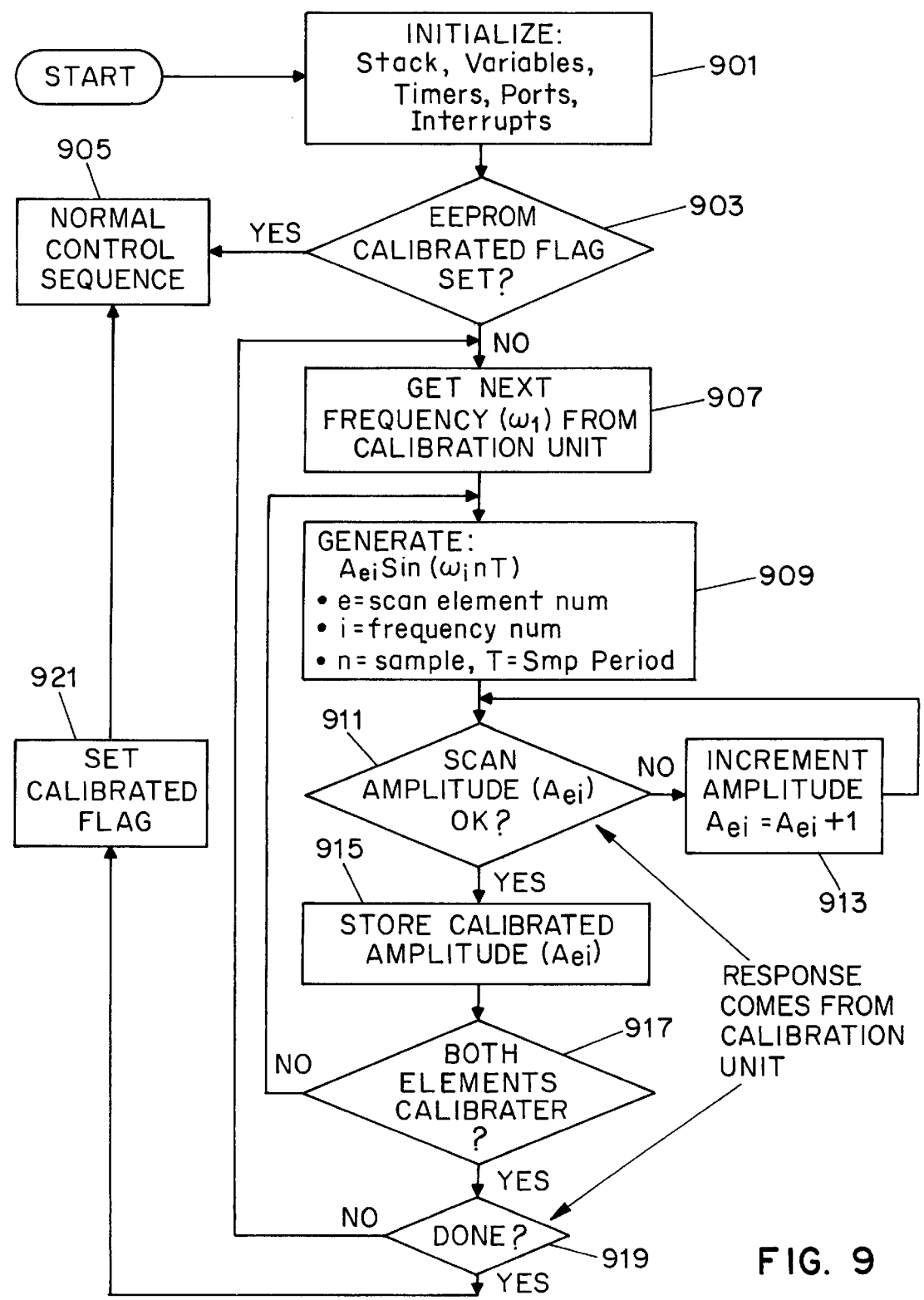
FIG. 9 is a flow diagram of a calibration routine utilized by the controller of FIG. 2 in calibrating the frequency response characteristics of the scan elements.

FIG. 9 depicts a process for calibrating the frequency response profiles of the scan elements if open loop control is used. The process is entered in an operation 901 by initializing the stack, variables, timers, ports, and interrupts stored in the memory 63 of the controller. The controller in an operation 903 checks an internal electric, erasable program read/only memory (EEPROM) to decide whether factory calibration of the frequency response for the scanning elements is required. A "yes" condition indicated that the calibrated flag has been sent and the controller returns to normal control sequence in an operation 905. A "no" condition initiates a calibration routine and the controller awaits commands from an external processor. In an operation 907 the controller receives the command from the external processor indicating the frequency of oscillations that it should produce for each scan element. In an operation 909, the controller generate a scan amplitude at a given frequency. An operation 911, increment the amplitude of the oscillation in an operation 913 until the external processor indicates the controller has reached the calibrated scan amplitude. The calibrated amplitude is stored in the memory 63 in an operation 915.

An operation 917 checks to determine whether amplitudes have been calibrated for both X and Y scanning elements. A "no" condition returns the process to step 909. A "yes" condition indicates that both X and Y frequency responses have been calibrated. An operation 919 checks to determine whether all frequencies have been calculated. A "no" condition returns the process to step 907. A "yes" condition sets a calibrated flag in an operation 921 and returns the controller to the operation 905 for normal control sequence.

Figure 10:
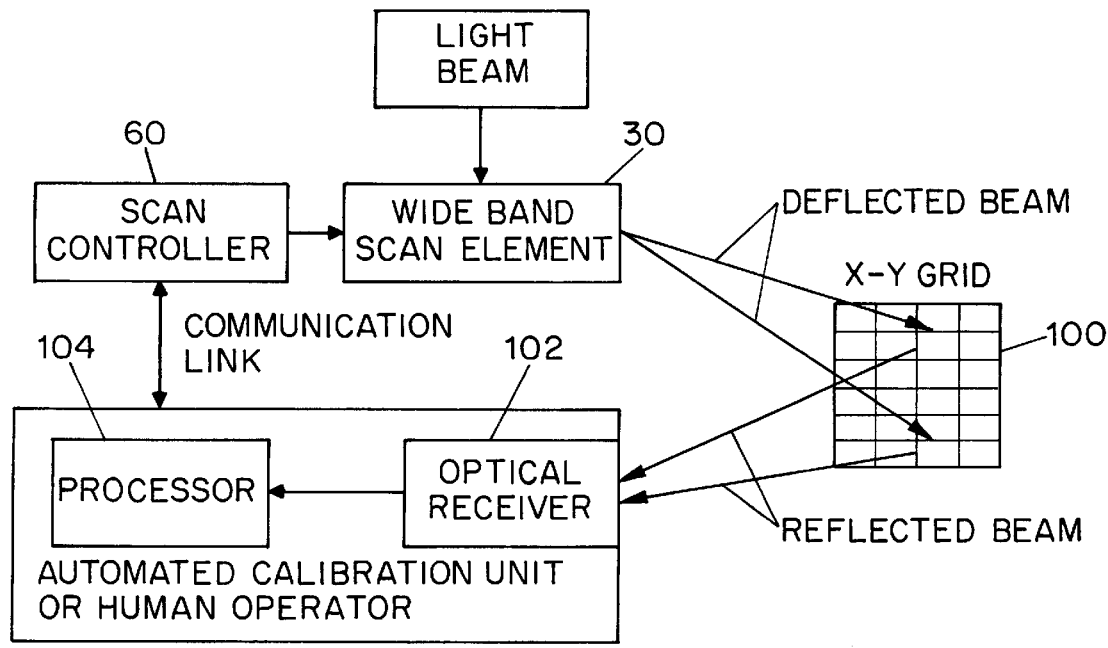
FIG. 10 is a block diagram of a system for automatic scan element calibration.

During the process of calibrating the frequency response of the scanning elements, an external processor will examine the length of a scan line for the scanning elements being calibrated. As shown in FIG. 10, the scan controller 60 drives the wide band scan element 30 through the power supply means (not shown) to generate a, scan line on an evenly-spaced grid pattern 100. An optical receiver 102, e.g., a photodiode, will collect the reflected light and transduce the grid marks to pulses. The number of pulses within a scan can be used to determine the scan amplitude in a processor 104. For each frequency contained in the desired frequency response, the correct scan amplitude is reached when the same arbitrary number of pulses within a scan line has been registered. The processor 104 is linked to the controller 60 to provide an indication when a scan pattern has been calibrated.

Figure 11:
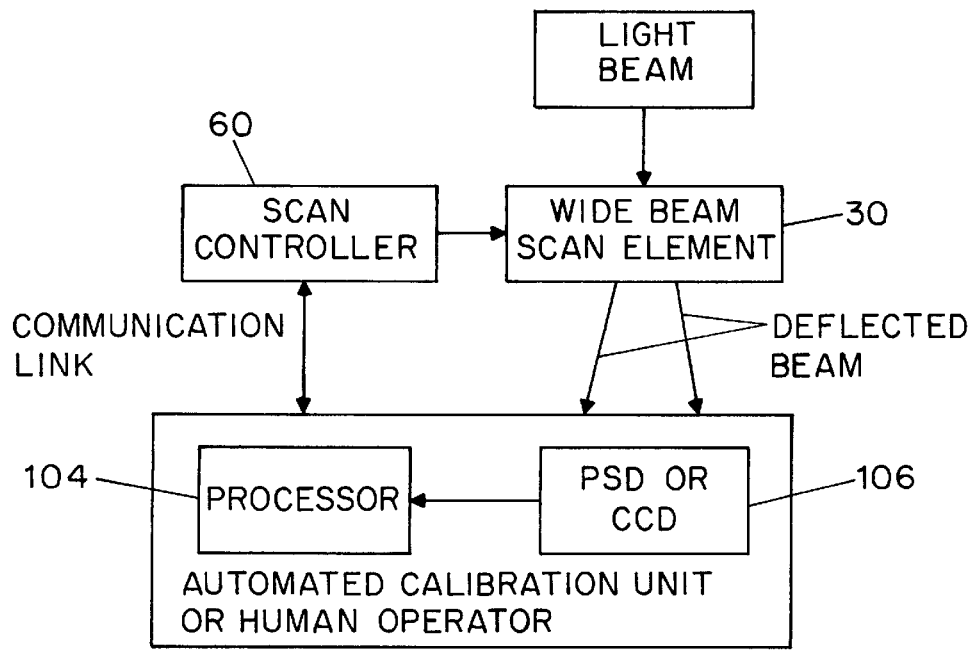
FIG. 11 is a block diagram of another system for automatic scan element calibration.

Another system for automatic scan element calibration is shown in FIG. 11. The scan element 30 scans a Position Sensitive Detector (PSD) or Charge Coupled Device (CCD) 106. The PSD or CCD devices directly register the scan amplitude. As the scan amplitude grow, so will the peaks of the analog signal representing the relative position of the laser spot from zero position. When a CCD device is used, results will be similar to that of the printed grid approach described in FIG. 10. However, the position signal will be transmitted via CCD cells rather than reflected from a printed grid pattern.

Summarizing, the present invention describes a scanning system for generating arbitrary rotatable multi-dimensional patterns using a controller which operates in either open or closed loop mode and compensates or equalizes frequency response differences between the scanning elements in the system. The controller in combination with a power means and feedback circuit generates error signals indicative of the difference between calibrated frequency response characteristics and actual frequency response characteristics of the scan elements. The error signals adjust the power means to conform the actual frequency response to the calibrated frequency response of the scan elements. Feedback signals from the scanning elements are provided either from coils driving the rotatable elements or optical fiber means in the scanning elements, not separate pick up coils as in the prior art. The controller and power supplies may be embedded in a portable scanner or installed in a fixed or surface-mounted scanner. By eliminating a pickup coil in the scanner for feedback voltages, the size and costs of the scanner can be significantly reduced without diminishing the response rate in calibrating desired and actual frequency response characteristics of the scanning elements.

While the invention has been described in a preferred embodiment, various changes can be made therein without departing from the spirit and scope of the invention, as defined in the appended claims.

We claim:

1. A scanning system capable of open or closed operation for generating arbitrary rotatable multi-dimensional scan patterns comprising:
    a) at least two scan elements for generating the arbitrary rotatable multi-dimensional scan patterns in response to a set of multi-frequency drive waveforms with each scan element optionally providing a feedback signal indicative of the actual position of the corresponding scan element;
    b) a driver responsive to a control signal for generating and supplying the set of drive waveforms to the at least two scan elements;
    c) controller for:
        i) storing a set of scan pattern parameters corresponding to a desired arbitrary rotatable multi-dimensional scan pattern;
        ii) storing for each scan element at least two sets of reference parameters:
            a) a first set of reference parameters defining angular characteristics for each scan element; and
            b) a second set of reference parameters defining a frequency characteristics for each of said scan elements;
                iii) a first means for using the feedback signal to determine a group of actual scan element parameters;
                iv) a generator for generating a set of correction signals indicative of the difference between the actual scan element parameters and the corresponding reference scan element parameters; and
                v) a second means for providing a control signal to the driver based upon the set of generated correction signals;
    whereby the scan elements are driven in concert and are compensated as a group for any scan pattern distortion.

2. The scanning system of claim 1 further comprising means for changing in real time the set of scan pattern parameters corresponding to desired arbitrary rotatable multi-dimensional scan patterns.

3. The scanning system of claim 2 further comprising means for generating a feedback signal from the scanning elements using a single coil.

4. The scanning system of claim 3 wherein the scan elements are subject to occasional and frequent monitoring of the scan elements frequency response to compensate for gradual changes.

5. The scanning system of claim 4 wherein the feedback signal is generated by magnetic or optical means.

6. The scanning system of claim 5 wherein the power means is a linear full bridge or an H-Bridge.

7. A scanning system for generating arbitrary rotatable multi-dimensional patterns and having scan element frequency response equalization to compensate for scan pattern distortions, comprising:
    a) at least two scan elements positioned substantially orthognally to each other for generating the arbitrary rotatable multi-dimensional patterns in response to drive waveforms;
    b) power means responsive to a control signal for generating and supplying complimentary drive waveforms to the orthognally positioned at least two scan elements; and
    c) controller means for (i) storing in a table the inverse of gain and phase values for each frequency component of a desired frequency response characteristics of the at least two substantially orthogonally positioned scan elements and (ii) generating the control signal in response to a comparison between a feedback signal from the at least two scan elements and the table of inverse gain and phase values whereby scan element frequency compensation is achieved.

8. The scanning system of claim 7 wherein the desired frequency response characteristics of the at least two scan elements is defined by parametric equations including alterable parameters for changing the desired frequency response characteristics of the at least two scan elements.

9. The scanning system of claim 8 wherein the control signal is generated solely from the table of inverse gain and phase values.

10. The scanning system of claim 9 wherein the table of inverse gain and phase values is calibrated from time to time using a calibration device.

11. The scanning system of claim 10 further including means for generating the feedback signal using scan elements with a single coil.

12. The scanner system of claim 11 wherein the power supply means is a linear full bridge or a digital H bridge.

13. The scanner system of claim 12 wherein the controller means includes a pulse width modulator for generating the control signal.

14. The scanner system of claim 13 wherein the feedback means includes magnetic or optical sensing of the scan elements.

15. In a scanning system for generating arbitrary rotatable multi-dimensional patterns including Lissajous patterns and having scan element frequency response equalization to compensate for scan pattern distortions, a method for controlling the generation of the arbitrary Lissajous scan patterns comprising the steps of:

a) determining if the system is using closed or open loop control;
  b) computing a desired analog waveform for orthogonally positioned scan elements, if closed loop system control is being used and performing the following steps:
    (i) sampling a feedback signal indicative of the actual frequency response of the scan elements;
    (ii) computing an error signal indicative of the difference between the desired frequency and actual frequency response of the scan elements;
    (iii) updating the analog waveforms to the scan elements to compensate for scan pattern distortions and return to step a;
  c) determining if the desired frequency response characteristic of the scan elements should be fine tuned, if open system control is being used and performing the following steps:
    (i) generating a new analog waveform for each new frequency applied to the scan elements;
    (ii) sampling feedback and adjusting parameters of the analog waveform to match calibrated values for the desired analog waveform;
    (iii) continuing step c(i) until all new frequencies have been fine tuned;
    (iv) providing updated parameters to the calibrated analog waveforms and return to step b(iii); and
  d) executing step c(iv) if the scan elements should not be fine tuned and open system control is being used.

16. In a scanning system capable of open or closed operation for generating arbitrary rotatable multi-dimensional scan patterns, a method of frequency compensation of at least two scan elements in the scanning system comprising the steps of:

a) generating the arbitrary rotatable multi-dimensional scan patterns in response to a set of drive waveforms for the at least two scan elements;
  b) generating and supplying the set of drive waveforms to the at least two scan elements from respective control signals from a plurality of control signals power means responsive; and
  c) operating a controller means for:
    i) storing a set of scan pattern parameters corresponding to the arbitrary rotatable multi-dimensional scan patterns;
    ii) storing at least two sets of feedback parameters:
      a) one set of feedback parameters defining each scan element with a particular angle;
      b) the other set of feedback parameters defining the feedback at a particular frequency; and
  d) generating the plurality of control signals outputted to the power means.

17. The method of claim 16 wherein the desired frequency response characteristics of the at least two scan elements is defined by parametric equations including alterable parameters for changing the desired frequency response characteristics of the at least two scan elements.

18. The method of claim 17 wherein the control signal is generated solely from a table of inverse gain and phase values.

19. The method of claim 18 wherein the table of inverse gain and phase values is calibrated from time to time using a calibration device.

20. The method of claim 19 further comprising the step of generating the feedback signal using scan elements with a single coil.

21. The method of claim 20 wherein the power supply means is a linear full bridge or a digital H bridge.

22. The method of claim 21 wherein the controller means includes a pulse width modulator for generating the control signal.

23. The method of claim 22 wherein the feedback means includes magnetic or optical sensing of the scan elements.

* * * * *